US010430432B2

(12) United States Patent
Bowman et al.

(10) Patent No.: US 10,430,432 B2
(45) Date of Patent: Oct. 1, 2019

(54) COLLABORATIVE PRODUCT LIFECYCLE MANAGEMENT

(71) Applicant: Brigham Young University, Provo, UT (US)

(72) Inventors: Kelly Eric Bowman, Provo, UT (US); Joshua Coburn, Orem, UT (US); Ammon Hepworth, Provo, UT (US); Charles Gregory Jensen, Provo, UT (US); Jordan Johnson, Lindon, UT (US)

(73) Assignee: Brigham Young University, Provo, UT (US)

( * ) Notice: Subject to any disclaimer, the term of this patent is extended or adjusted under 35 U.S.C. 154(b) by 572 days.

(21) Appl. No.: 14/738,667

(22) Filed: Jun. 12, 2015

(65) Prior Publication Data

US 2016/0019273 A1 Jan. 21, 2016

Related U.S. Application Data

(60) Provisional application No. 62/011,398, filed on Jun. 12, 2014, provisional application No. 62/011,417, filed on Jun. 12, 2014.

(51) Int. Cl.
*G06F 16/25* (2019.01)
*H04L 29/08* (2006.01)
(Continued)

(52) U.S. Cl.
CPC ......... *G06F 16/258* (2019.01); *G06Q 10/087* (2013.01); *G06Q 10/10* (2013.01);
(Continued)

(58) Field of Classification Search
CPC .................. G06F 17/30569; H04L 67/10
(Continued)

(56) References Cited

U.S. PATENT DOCUMENTS

2005/0267771 A1* 12/2005 Biondi ................ G06Q 10/06
705/7.36
2011/0225183 A1* 9/2011 Rezayat ................ G06Q 10/10
707/769

OTHER PUBLICATIONS

Liu., Workflow Engine-driven Universal Product Lifecycle Management System Framework, 2014, IEEE, 1368-1372.*

* cited by examiner

*Primary Examiner* — Jean B Fleurantin
(74) *Attorney, Agent, or Firm* — Kunzler Bean & Adamson

(57) ABSTRACT

An apparatus, method, and program product are disclosed for collaborative product lifecycle management. One apparatus includes a data processing module that receives product lifecycle management ("PLM") data from multiple client applications in a collaborative environment. The PLM data may be in a client specific format. The apparatus includes a subscription module that receives one or more subscription requests from each client application. Moreover, the apparatus includes a conversion module that converts the PLM data from the client specific format to a generic format. The apparatus includes a storage module that stores the generic format of the PLM data. The conversion module may convert subscription data from the generic format to the client specific format. The subscription data may correspond to the PLM data stored in the generic format. The subscription module may provide the subscription data to the multiple client applications based on the one or more subscription requests.

20 Claims, 6 Drawing Sheets

(51) Int. Cl.
*G06Q 10/10* (2012.01)
*G06Q 10/08* (2012.01)

(52) U.S. Cl.
CPC .......... *H04L 67/10* (2013.01); *H04L 67/1095* (2013.01); *H04L 67/125* (2013.01); *H04L 67/2823* (2013.01)

(58) Field of Classification Search
USPC ........................................................ 707/811
See application file for complete search history.

500

| Part Number 502 | Hand Calculated Weight 504 | Target Weight 506 | CAD Calculated Weight 508 | Actual Scale Weight 510 |
|---|---|---|---|---|
| 1 | 100* | 90 | 10 | |
| 2 | 200 | 210 | 300 | 210* |
| 3 | 400* | 350 | 0.5 | |
| 4 | 300* | 350 | 10000 | |
| 5 | 150 | 200 | 175* | |
| 6 | 275 | 400 | 280* | |
| 7 | 360 | 350 | 355 | 350* |
| Total 512 | 1785 | 1950 | 11120.5 | 560 |

FIG. 5

COLLABORATIVE PRODUCT LIFECYCLE MANAGEMENT

CROSS REFERENCE TO RELATED APPLICATIONS

The present application is a Non-Provisional Patent Application that claims priority to U.S. Provisional Application No. 62/011,398, filed on Jun. 12, 2014 and U.S. Provisional Application No. 62/011,417, filed on Jun. 12, 2014, which are incorporated herein by reference in their entirety.

FIELD

The subject matter disclosed herein relates to collaborative projects, and more particularly relates to collaborative product lifecycle management.

BACKGROUND

Various projects may operate in a collaborative environment. For example, a project operating in a collaborative environment may include lifecycle management, a document, a spreadsheet, a drawing, code, a simulation, a model, a presentation, a form, an animation, and an architecture. Many users may access and/or modify the project.

BRIEF SUMMARY

An apparatus for collaborative product lifecycle management is disclosed. A method and computer program product also perform the functions of the apparatus. In one embodiment, an apparatus includes a data processing module that receives product lifecycle management ("PLM") data from multiple client applications in a collaborative environment. In some embodiments, the PLM data is in a client specific format. The apparatus, in a further embodiment, includes a subscription module that receives one or more subscription requests from each client application of the multiple client applications. In another embodiment, the apparatus includes a conversion module that converts the PLM data from the client specific format to a generic format. In certain embodiments, the apparatus includes a storage module that stores the generic format of the PLM data. In some embodiments, the conversion module converts subscription data from the generic format to the client specific format, the subscription data corresponds to the PLM data stored in the generic format, and the subscription module provides the subscription data to the multiple client applications based on the one or more subscription requests.

In some embodiments, the conversion module includes a mapping module that includes conversion algorithms to convert the PLM data from the client specific format to the generic format. In one embodiment, the storage module includes a database. In such an embodiment, the apparatus may include an estimation module that calculates an estimate using data from multiple related fields in the database. In some embodiments, the estimation module uses flagged items from the multiple related fields to calculate the estimate. In one embodiment, the apparatus includes a selection module that selects items to mark as the flagged items.

A method for collaborative product lifecycle management, in one embodiment, includes receiving product lifecycle management ("PLM") data from multiple client applications in a collaborative environment. In some embodiments, the PLM data is in a client specific format. The method includes, in one embodiment, receiving one or more subscription requests from each client application of the multiple client applications. In some embodiments, the method includes converting the PLM data from the client specific format to a generic format. In certain embodiments, the method storing the generic format of the PLM data. In one embodiment, the method includes converting subscription data from the generic format to the client specific format. In such an embodiment, the subscription data corresponds to the PLM data stored in the generic format. In some embodiments, the method includes providing the subscription data to the multiple client applications based on the one or more subscription requests.

In one embodiment, the PLM data includes one or more of engineering data, computer-aided design ("CAD") data, and supply-chain management data. In another embodiment, converting the PLM data from the client specific format to the generic format includes using conversion algorithms. In certain embodiments, storing the generic format of the PLM data includes storing the generic format of the PLM data in a database. In certain embodiments, the database operates with referential integrity.

In one embodiment, the method includes calculating an estimate using data from multiple related fields in the database. In some embodiment, calculating the estimate using the data from the multiple related fields in the database includes using flagged items from the multiple related fields to calculate the estimate. In such embodiments, the method may include manually selecting items to mark as the flagged items. In certain embodiments, the method may include selecting items to mark as the flagged items using a predetermined algorithm.

In one embodiment, converting subscription data from the generic format to the client specific format includes using conversion algorithms. In some embodiments, providing the subscription data to the multiple client applications based on the one or more subscription requests includes providing immediate updates to the multiple client applications before the PLM data is stored.

In one embodiment, a computer program product for product lifecycle management ("PLM") collaboration includes a computer readable storage medium having program instructions embodied therewith. The program instructions, in some embodiments, are executable by a processor to cause the processor to receive PLM data from multiple client applications in a collaborative environment. In certain embodiments the PLM data is in a client specific format. The program instructions, in one embodiment, are executable by a processor to cause the processor to receive one or more subscription requests from each client application of the multiple client applications. The program instructions, in certain embodiments, are executable by a processor to cause the processor to convert the PLM data from the client specific format to a generic format. The program instructions, in one embodiment, are executable by a processor to cause the processor to store the generic format of the PLM data. The program instructions, in some embodiments, are executable by a processor to cause the processor to convert subscription data from the generic format to the client specific format. In such embodiments, the subscription data may correspond to the PLM data stored in the generic format. In certain embodiments, the program instructions are executable by a processor to cause the processor to provide the subscription data to the multiple client applications based on the one or more subscription requests.

In some embodiments, the PLM data includes one or more of engineering data, computer-aided design ("CAD") data, and supply-chain management data. The program instructions, in one embodiment, are executable by a processor to cause the processor to use conversion algorithms to convert the PLM data from the client specific format to the generic format.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a chart illustrating one embodiment of data estimation in accordance with one embodiment of the present invention;

DETAILED DESCRIPTION

Figure 1:
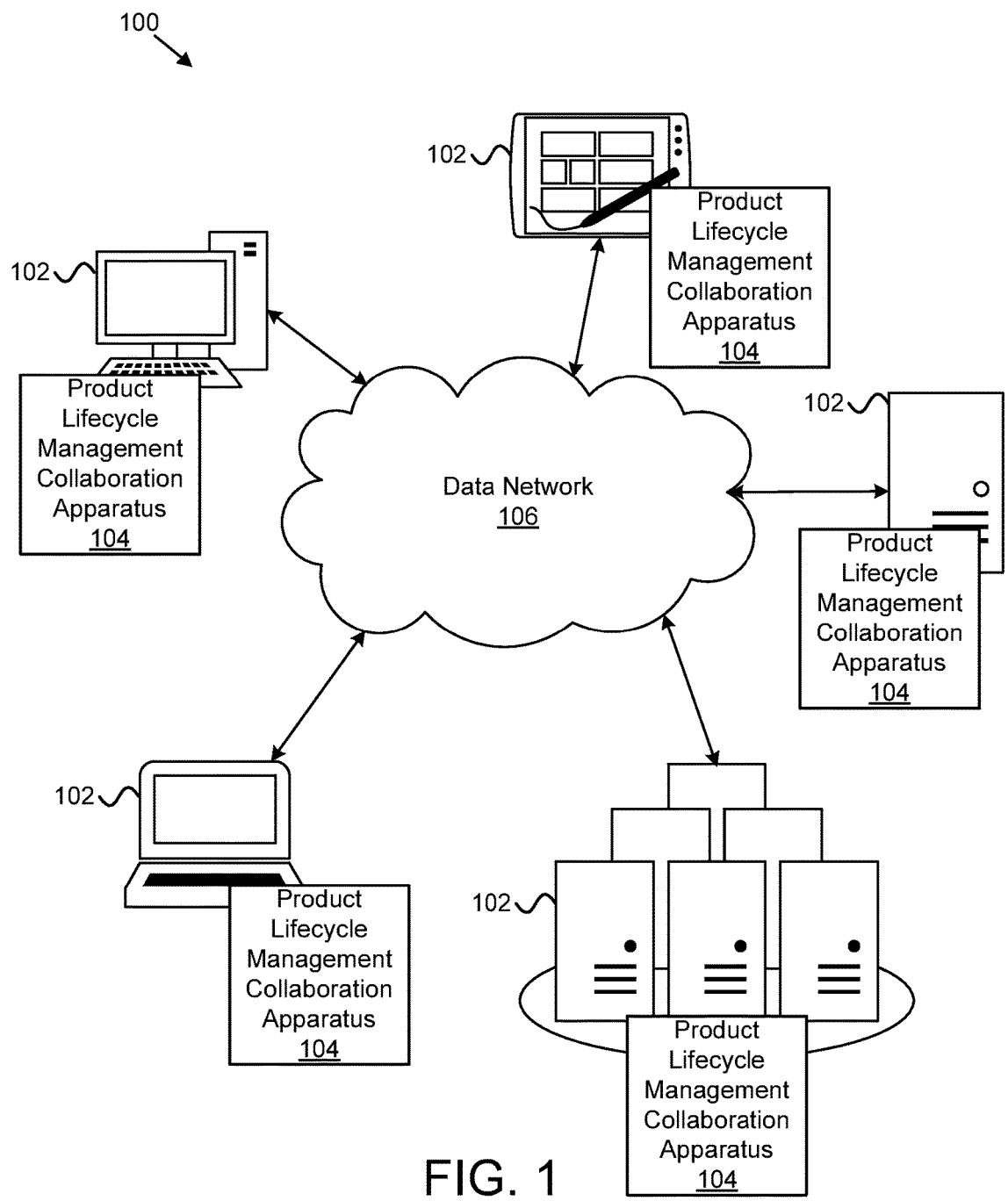
FIG. 1 is a schematic block diagram illustrating one embodiment of a system for collaborative product lifecycle management in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for collaborative product lifecycle management. In one embodiment, the system 100 includes information handling devices 102, product lifecycle management ("PLM") collaboration apparatuses 104, and networks 106. Even though a particular number of information handling devices 102, PLM collaboration apparatuses 104, and networks 106 are depicted in the system 100 of FIG. 1, one of skill in the art will recognize that any number or configuration of information handling devices 102, PLM collaboration apparatuses 104, and networks 106 may be present in the system 100.

The information handling devices 102, in certain embodiments, include computing devices, such as desktop computers, laptop computers, tablet computers, smart phones, smart televisions, smart watches, or the like. The information handling devices 102 may also include servers, such as web servers, application servers, file servers, media servers, email servers, cloud servers, backup servers, virtual servers, computer-aided design ("CAD") servers, or the like. In some embodiments, the information handling devices 102 may be part of a data center used for data storage, data backup, data replication, disaster recovery, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated production information handling devices 102. Moreover, the information handling devices 102 may comprise one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, or the like. In some embodiments, the information handling devices 102 are in communication via one or more data networks 106, described below.

In one embodiment, the PLM collaboration apparatus 104 receives PLM data from multiple client applications in a collaborative environment. In such an embodiment, the PLM data may be in a client specific format. In certain embodiments, the PLM collaboration apparatus 104 receives one or more subscription requests from each client application of the multiple client applications. In some embodiments, the PLM collaboration apparatus 104 converts the PLM data from the client specific format to a generic format. In one embodiment, the PLM collaboration apparatus 104 stores the generic format of the PLM data. In certain embodiments, the PLM collaboration apparatus 104 converts subscription data from the generic format to the client specific format. In such embodiments, the subscription data corresponds to the PLM data stored in the generic format. In some embodiment, the PLM collaboration apparatus 104 provides the subscription data to the multiple client applications based on the one or more subscription requests. In this manner, the PLM collaboration apparatus 104 may allow a large number of users that may be using different applications to collaboratively participate in modifying PLM data. Furthermore, updates to the PLM data may be quickly and automatically used to update different applications that use the PLM data. In certain embodiments, as described below with reference to FIGS. 2 and 3, the PLM collaboration apparatus 104 includes multiple modules that perform the operations of the PLM collaboration apparatus 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory ("RAM"), or the like.

Figure 2:
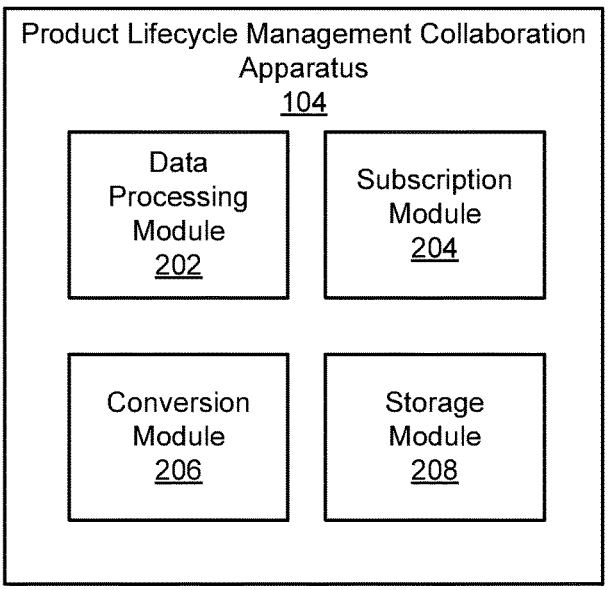
FIG. 2 is a schematic block diagram illustrating one embodiment of a module for collaborative product lifecycle management in accordance with one embodiment of the present invention.

FIG. 2 is a schematic block diagram illustrating one embodiment of a module 200 for collaborative product lifecycle management. In one embodiment, the module 200 includes an embodiment of a PLM collaboration apparatus 104. The PLM collaboration apparatus 104, in various embodiments, includes one or more of a data processing module 202, a subscription module 204, a conversion module 206, and a storage module 208, which are described in more detail below.

In one embodiment, the data processing module 202 receives PLM data from multiple client applications in a collaborative environment. In some embodiments, the PLM data may be in a client specific format. The PLM data may include one or more of engineering data, computer-aided design ("CAD") data, and supply-chain management data. Moreover, the PLM data may include any type of engineering data, such as aerospace, agricultural, automotive, biological, biomedical, chemical, civil, communications, computer, electrical, environmental, geological, industrial, material, mechanical, software, and/or structural engineering data, and so forth. For example, the PLM data may include data corresponding to weight, cost, a structural analysis, an aero analysis, weights accounting, material analysis, electrical analysis, and so forth. The data processing module 202 may receive the PLM data from any suitable engineering tool. The engineering tool may be any software application that performs engineering functions using PLM data. Moreover, the engineering tool may be produced by any suitable manufacturer.

Furthermore, the PLM data may include CAD data generated by any suitable CAD software application. In addition, the CAD software application may be produced by any suitable manufacturer. The PLM data may include supply-chain management data generated by any suitable supply-chain management software application. Moreover, the supply-chain management software application may be produced by any suitable manufacturer. Accordingly, the data processing module 202 may receive data output in a variety of client specific formats (e.g., data formats that are specific to a software application that produces the data) from a variety of engineering tools, CAD software applications, and supply-chain management software applications.

The subscription module 204, in some embodiments, receives one or more subscription requests from each client application of the multiple client applications. A subscription request may be a request for particular PLM data that is used by the respective client application. The subscription request is used to create a subscription to the particular PLM data. The subscription may provide immediate updates of the particular PLM data to the subscribing client application so that the client application has the most up to date PLM data immediately before and/or after updates are made to the PLM data. As may be appreciated, one client application may have multiple subscription requests to establish multiple subscriptions for PLM data. Moreover, each client application may use different PLM data and, therefore, may have different subscription requests.

In certain embodiments, the subscription module 204 provides subscription data to the multiple client applications based on the one or more subscription requests received by the subscription module 204. For example, a first client application may have a subscription to a first subscription data (e.g., first PLM data). Accordingly, the subscription module 204 may provide the first subscription data to the first client application before and/or after the first subscription data is stored and/or updated.

In one embodiment, providing the subscription data to the multiple client applications includes providing immediate updates to the multiple client applications before and/or after the PLM data is stored and/or updated. Immediate updates may be conducted immediately (i.e., without intended hesitation) and may occur in real-time from the perspective of the user. As may be appreciated, immediate updates may also be considered real-time updates, near real-time updates, substantially real-time updates, dynamic updates, and so forth. For example, immediate updates may be provided automatically within seconds or minutes of a modification to PLM data being made. Moreover, immediate updates may operate in a collaborative environment such that when modifications to the PLM data are made, stored, and/or saved, the modifications are provided to other concurrent users of the PLM data via subscriptions so that all subscribing clients have the latest modifications.

In contrast, deferred updates may be considered selective updates, non-real time updates, delayed updates, and so forth. For example, deferred updates may be provided at a scheduled time, when computer resources are sufficient, upon selection, on-demand, and so forth. Moreover, deferred updates may operate in a collaborative environment such that when modifications are made and/or saved, the modifications are not immediately provided to the client applications, but are stored to be provided to client applications at a later time, such as in batches and/or being selectively applied.

The conversion module 206, in certain embodiments, converts the PLM data from the client specific format to a generic format. For example, in certain embodiments, a client application may use PLM data in a client specific format. In some embodiments, the client application may access a standard programming class to provide updates to the PLM data. Moreover, the standard programming class provides the PLM data from the client application in the client specific format to the conversion module 206. The conversion module 206 may receive the PLM data in the client specific format and may convert the PLM data from the client specific format into a generic format. Such a conversion may be performed as described in U.S. patent application Ser. No. 14/243,584 filed on Apr. 2, 2014 entitled "System, Method, and Apparatus for Collaborative CAX Editing," and U.S. Provisional Patent Application No. 62/011,391, filed on Jun. 12, 2014 entitled "Neutral Multi-User CAD Data Representation," both of which are hereby incorporated by reference in their entirety. Moreover, in some embodiments, the conversion module 206 may convert subscription data from the generic format to the client specific format. For example, a client application may have a subscription to subscription data that includes PLM data stored in the generic format. After a modification is made to the subscription data, the conversion module 206 may convert the subscription data to one or more client specific formats based on the subscriptions to the subscription data so that the subscription data may be provided to the subscribers in the data format of a respective client application.

In one embodiment, the storage module 208 stores the generic format of the PLM data. The generic format may be a data format that facilitates use by multiple different types of client applications. For example, the generic format may be a standardized format to which all client specific formats are converted before the data is stored so that the generic format may be converted into client specific formats. In some embodiments, the storage module 208 includes a database and the generic format of the PLM data may be stored in the database. In various embodiments, the database may operate with referential integrity. For example, to operate with referential integrity the data in the database may require every value of one attribute (e.g., column) of a relation (e.g., table) to exist as a value of another attribute in a different relation (e.g., table).

The storage module 208 may store the PLM data in any suitable device, such as a one or more storage volumes, storage devices, RAID devices or configurations, or the like, such as hard-disk drives, solid-state drives, flash memory devices, RAM, SATA devices, tape devices, or the like. In some embodiments, at least a portion of the data processing module 202, the subscription module 204, the conversion module 206, and the storage module 208 includes one or more of hardware and executable code. In such embodiments, the executable code may be stored on one or more computer readable storage media.

Figure 3:
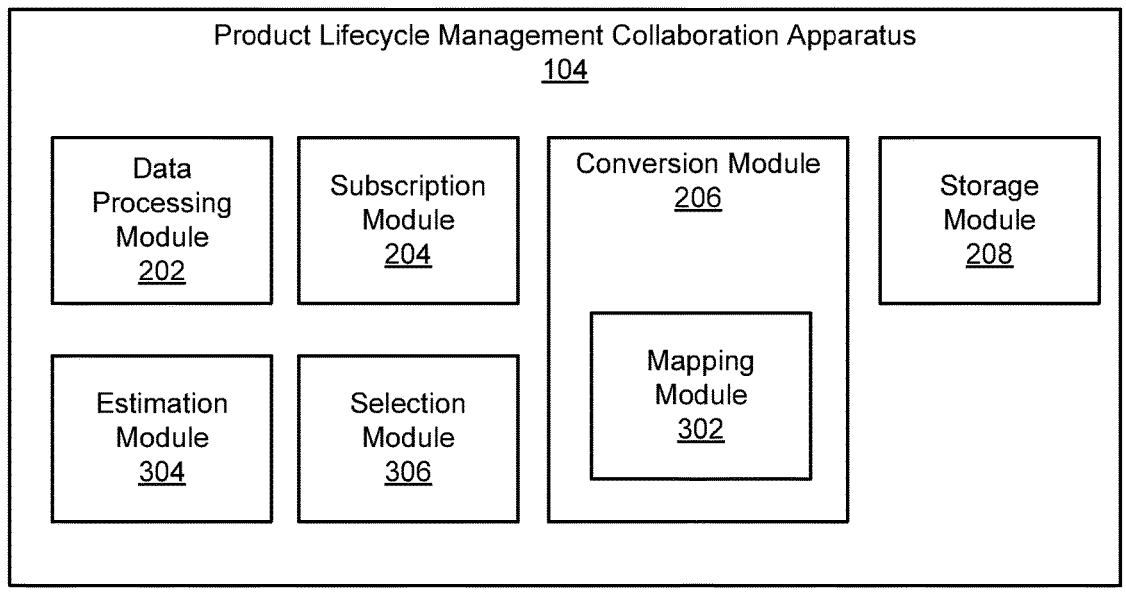
FIG. 3 is a schematic block diagram illustrating one embodiment of another module for collaborative product lifecycle management in accordance with one embodiment of the present invention.

FIG. 3 is a schematic block diagram illustrating one embodiment of another module 300 for collaborative product lifecycle management. In one embodiment, the module 300 includes an embodiment of a PLM collaboration apparatus 104. The PLM collaboration apparatus 104, in various embodiments, includes one or more of a data processing module 202, a subscription module 204, a conversion module 206, and a storage module 208, which may be substantially similar to the data processing module 202, the subscription module 204, the conversion module 206, and the storage module 208 described above. The PLM collaboration apparatus 104 may also include one or more of a mapping module 302, an estimation module 304, and a selection module 306, which are described in more detail below.

In one embodiment, the conversion module 206 includes the mapping module 302. The mapping module 302 may include conversion algorithms to convert the PLM data between the client specific format and the generic format. For example, the conversion algorithms may be used to convert the PLM data from the client specific format to the generic format and/or to convert the PLM data from the generic format to the client specific format. In some embodiments, subscription data may be converted from the generic format to the client specific format using conversion algorithms of the mapping module 302.

During operation, PLM data in the client specific format may be received by the conversion module 206. The mapping module 302 may include a mapping that is used to convert the PLM data from the client specific format to the generic format. The mapping may link specific conversion algorithms to a specific client and/or type of PLM data in order to convert the client specific format to the generic format. As may be appreciated, header data and/or other data may be included with the PLM data so that the mapping module 302 knows the client specific format of the data and/or what PLM data is received.

Furthermore, during operation, PLM data in the generic format may be received by the conversion module 206. The mapping module 302 may include a mapping that is used to convert the PLM data from the generic format to one or more client specific formats. The mapping may link specific conversion algorithms to a specific client and/or type of PLM data in order to convert the generic format to the client specific format. As may be appreciated, header data and/or other data may be included with the PLM data so that the mapping module 302 knows which client specific format or formats to convert the generic format PLM data to.

The estimation module 304, in certain embodiments, calculates an estimate using data from multiple related fields in a database. As may be appreciated, the related fields of the database may include different fidelities of data. For example, a set of related fields may include fields corresponding to weight, such as hand calculated weight, CAD calculated weight, and actual weight. For an assembly, only one of the related fields may be the most accurate field for each component. For example, for one component, the hand calculated weight may be the most accurate, while for another component the actual weight may be the most accurate. In some embodiments, the estimation module 304 uses flagged items from the multiple related fields to calculate the estimate. For example, for each component of an assembly only one of the related fields may be flagged as the most accurate field for that component. To determine an estimate for the entire assembly, each of the flagged fields may be used, such as by adding together the values stored in the flagged fields.

The selection module 306 may facilitate selection of items to mark as the flagged items. For example, the selection module 306 may enable a user to mark as flagged one field for each component in an assembly. In certain embodiments, the selection module 306 may select a default field for each component in an assembly to be flagged. As may be appreciated, the default field may be selected using a predetermined algorithm. For example, the selection module 306 may by default select entries according to a field that is most likely to be accurate. In an example using weight, the algorithm may include: if there is an actual weight, flag the actual weight as the most accurate weight; if there is no actual weight, but there is a hand calculated weight, then select the hand calculated weight as the most accurate weight; and if there is no actual or hand calculated weight, select a CAD estimated weight as the most accurate weight.

Figure 4:
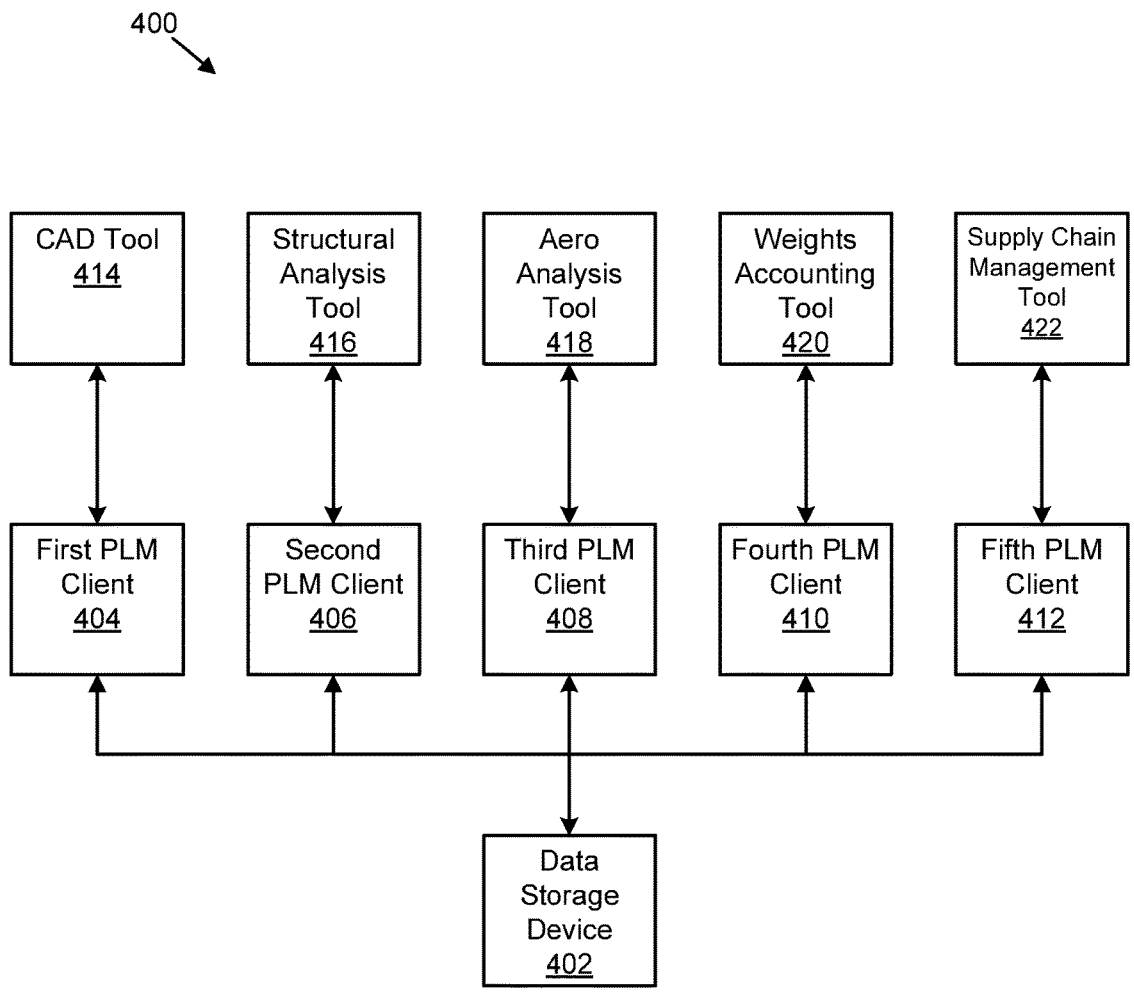
FIG. 4 is a schematic block diagram illustrating one embodiment of another system for collaborative product lifecycle management in accordance with one embodiment of the present invention.

FIG. 4 is a schematic block diagram illustrating one embodiment of another system 400 for collaborative product lifecycle management. As illustrated, the system 400 includes a data storage device 402. The data storage device 402 may store and/or convert PLM data. Moreover, the data storage device 402 sends PLM data to and/or receives PLM data from a first PLM client 404, a second PLM client 406, a third PLM client 408, a fourth PLM client 410, and a fifth PLM client 412. As may be appreciated, the system 400 may include fewer or more PLM clients. Indeed, in certain embodiments, the system 400 may include hundreds or thousands of PLM clients.

The PLM clients 404-412 may all be different types of clients (e.g., software from different manufacturers) or one or more of the PLM clients 404-412 may be the same type of client (e.g., software from the same manufacturer). Accordingly, in certain embodiments, the data storage device 402 may facilitate converting generically stored data to client specific data suitable for the PLM clients 404-412, such as by using the conversion module 206 and/or the mapping module 302. However, in other embodiments, a device separate from the data storage device 402 may facilitate converting generically stored data to client specific data suitable for the PLM clients 404-412.

Various other tools may send and/or receive PLM data to one or more of the PLM clients 404-412, as illustrated. Specifically, a CAD tool 414 may communicate with the first PLM client 404, a structural analysis tool 416 may communicate with the second PLM client 406, an aero analysis tool 418 may communicate with the third PLM client 408, a weights accounting tool 420 may communicate with the fourth PLM client 410, and a supply chain management tool 422 may communicate with the fifth PLM client 412. Although the tools 414-422 are illustrated as communicating with a specific one of the PLM clients 404-412, any of the tools 414-422 may communicate with any of the PLM clients 404-412 and/or any of the tools 414-422 may communicate directly with the data storage device 402. Furthermore, the system 400 may include fewer or more tools.

The PLM clients 404-412 and the tools 414-422 may be used to access, read, modify, and/or update the PLM data stored on the data storage device 402. As discussed previously, the PLM clients 404-412 and the tools 414-422 may use client specific formats of the PLM data. Accordingly, the client specific format is provided to the data storage device 402 and converted to a generic format before being stored. In addition, when the PLM clients 404-412 and the tools 414-422 access and/or receive data via subscription, the generic format of the PLM data is converted to the client specific format of the respective PLM client 404-412 or tool 414-422.

FIG. 5 is a chart 500 illustrating one embodiment of data estimation. In this example, an assembly includes parts having a part number 502. Specifically, the part numbers 502 are labeled 1, 2, 3, 4, 5, 6, and 7. For each part number 502, there are multiple related fields that may be populated. The multiple related fields include a hand calculated weight 504, a target weight 506, a CAD calculated weight 508, and an actual scale weight 510. A total 512 is a sum of all of the weights of the parts for a particular field. As illustrated, the totals 512 of the hand calculated weight 504, the target weight 506, the CAD calculated weight 508, and the actual scale weight 510 may vary significantly.

Each part number 502 may only have some of the multiple related fields populated. Furthermore, as illustrated, each part number 502 has only one field of the related fields flagged with an asterisk "*." To estimate a total for all of the parts that is more accurate than the totals 512 of the individual fields, the flagged weights are added together. In the illustrated embodiment, when the flagged weights are added together, the estimated weight is 1815 (100+210+400+300+175+280+350). As set forth above, the flagged fields may be manually selected by a user and/or predetermined using an algorithm. For example, if data exists in the actual scale weight 510 field, that data may be flagged by default. Furthermore, if there is no data in the actual scale weight 510 field, the hand calculated weight 504 may be flagged by default, and so forth. Accordingly, an estimate that is more accurate than any single total 512 of one field may be determined.

Figure 6:
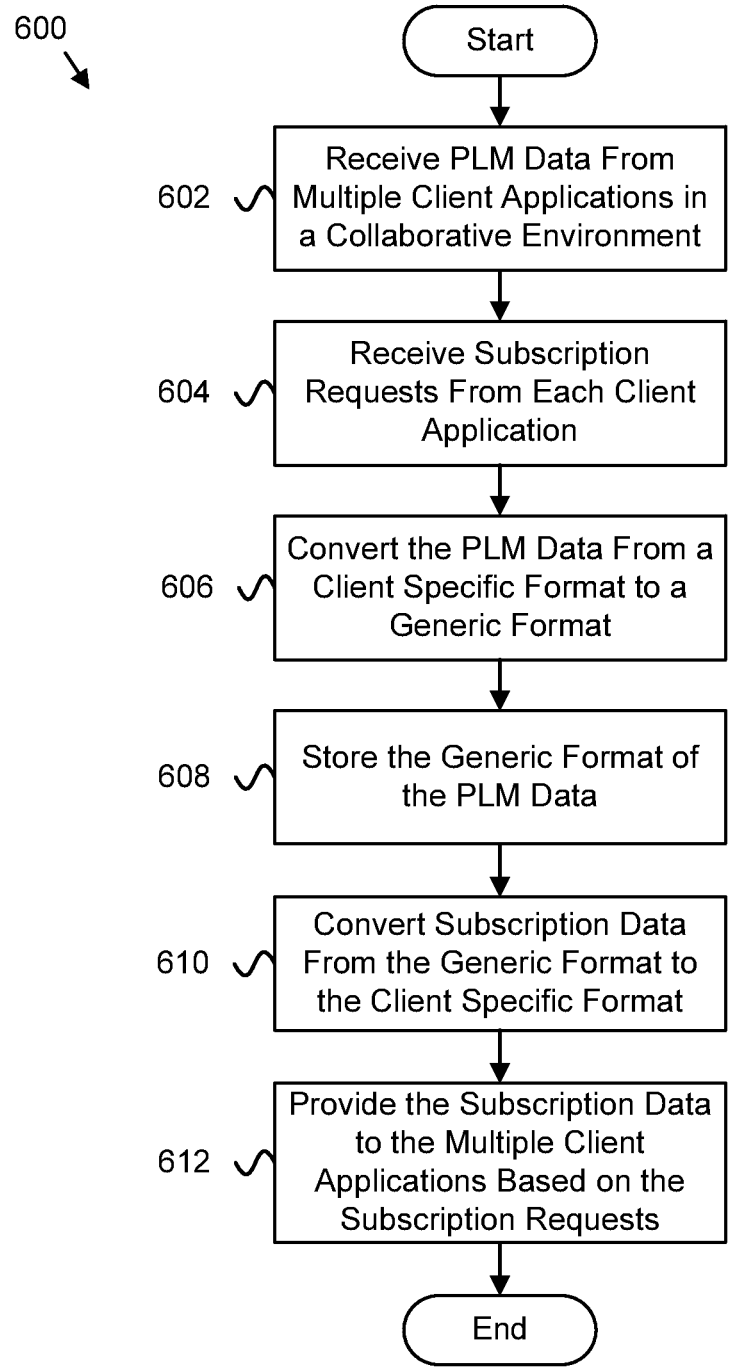
FIG. 6 is a schematic flow chart diagram illustrating one embodiment of a method for collaborative product lifecycle management in accordance with one embodiment of the present invention.

FIG. 6 is a schematic flow chart diagram illustrating one embodiment of a method 600 for collaborative product lifecycle management. The method 600 begins and the PLM collaboration apparatus 104 receives 602 PLM data from multiple client applications in a collaborative environment. In certain embodiments, the PLM data is in a client specific format. In some embodiments, the data processing module 202 receives 602 the PLM data from multiple client applications in the collaborative environment. In one embodiment, the PLM data may include one or more of engineering data, CAD data, and supply-chain management data.

The PLM collaboration apparatus 104 receives 604 one or more subscription requests from each client application of the multiple client applications. In some embodiments, the subscription module 204 receives 604 the one or more subscription requests from each client application of the multiple client applications. In some embodiments, the PLM collaboration apparatus 104 converts 606 the PLM data from the client specific format to a generic format. In certain embodiments, the conversion module 206 converts 606 the PLM data from the client specific format to the generic format. The PLM collaboration apparatus 104 stores 608 the generic format of the PLM data. In certain embodiments, the storage module 208 stores 608 the generic format of the PLM data.

The PLM collaboration apparatus 104 converts 610 subscription data from the generic format to the client specific format. In certain embodiments, the subscription data corresponds to the PLM data stored in the generic format. In some embodiments, the conversion module 206 converts 610 the subscription data from the generic format to the client specific format. In some embodiments, the PLM collaboration apparatus 104 provides 612 the subscription data to the multiple client applications based on the one or more subscription requests. In certain embodiments, the data processing module 204 provides 612 the subscription data to the multiple client applications based on the one or more subscription requests, and the method 600 ends. In one embodiment, providing 612 the subscription data to the multiple client applications based on the one or more subscription requests includes providing immediate updates to the multiple client applications before and/or after the PLM data is stored. As may be appreciated, the elements of the method 600 may occur in real-time, such that PLM data is updated immediately to subscribers after modifications are made to the PLM data, conversions are performed in real-time, displaying is performed in real-time, and so forth.

Figure 7:
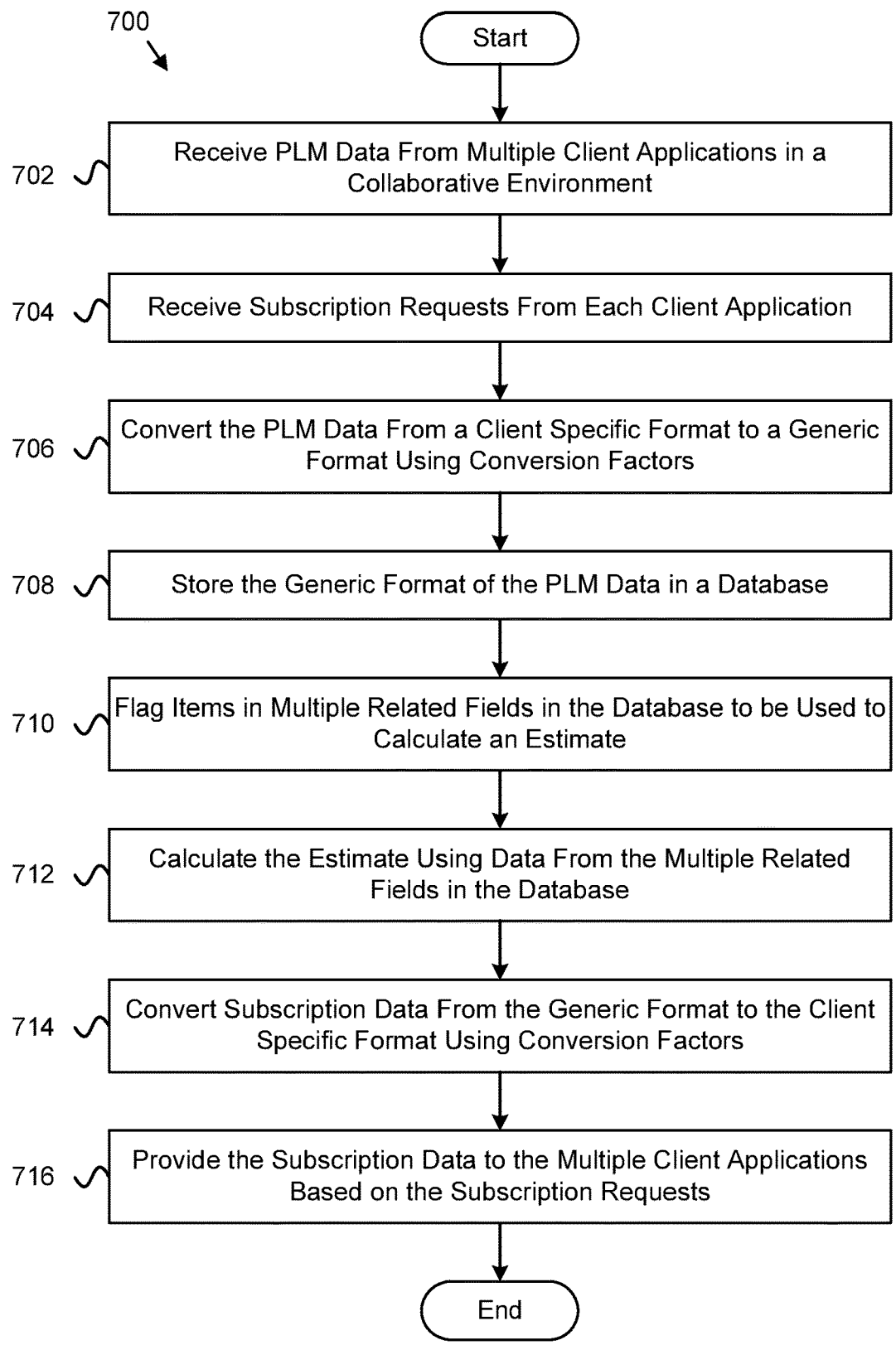
FIG. 7 is a schematic flow chart diagram illustrating one embodiment of another method for collaborative product lifecycle management in accordance with one embodiment of the present invention.

FIG. 7 is a schematic flow chart diagram illustrating one embodiment of another method 700 for collaborative product lifecycle management. The method 700 begins and the PLM collaboration apparatus 104 receives 702 PLM data from multiple client applications in a collaborative environment. In certain embodiments, the PLM data is in a client specific format. In some embodiments, the data processing module 202 receives 702 the PLM data from multiple client applications in the collaborative environment. In one embodiment, the PLM data may include one or more of engineering data, CAD data, and supply-chain management data.

The PLM collaboration apparatus 104 receives 704 one or more subscription requests from each client application of the multiple client applications. In some embodiments, the subscription module 204 receives 704 the one or more subscription requests from each client application of the multiple client applications. In some embodiments, the PLM collaboration apparatus 104 converts 706 the PLM data from the client specific format to a generic format, such as by using conversion algorithms (or functions). In certain embodiments, the conversion module 206 converts 706 the PLM data from the client specific format to the generic format using conversion algorithms. The PLM collaboration apparatus 104 stores 708 the generic format of the PLM data in a database. In certain embodiments, the storage module 208 stores 708 the generic format of the PLM data in a database. In some embodiments, the database operates with referential integrity.

The PLM collaboration apparatus 104 flags 710 items in multiple related fields in the database to be used to calculate an estimate. As may be appreciated, flagging 710 the items may include manually selecting items to mark as the flagged items and/or selecting items to mark as the flagged items using a predetermined algorithm. In some embodiments, the selection module 306 flags 710 items in multiple related fields in the database to be used to calculate the estimate. In some embodiments, the PLM collaboration apparatus 104 calculates 712 the estimate using data (e.g., flagged items) from the multiple related fields in the database. In certain embodiments, the estimation module 304 calculates 712 the estimate using data (e.g., flagged items) from the multiple related fields in the database.

The PLM collaboration apparatus 104 converts 714 subscription data from the generic format to the client specific format, such as by using conversion algorithms (or functions). In certain embodiments, the subscription data corresponds to the PLM data stored in the generic format. In some embodiments, the conversion module 206 converts 714 the subscription data from the generic format to the client specific format. In some embodiments, the PLM collaboration apparatus 104 provides 716 the subscription data to the multiple client applications based on the one or more subscription requests. In certain embodiments, the data processing module 204 provides 716 the subscription data to the multiple client applications based on the one or more subscription requests, and the method 700 ends. In one embodiment, providing 716 the subscription data to the multiple client applications based on the one or more subscription requests includes providing immediate updates to the multiple client applications before and/or after the PLM data is stored. As may be appreciated, the elements of the method 700 may occur in real-time, such that PLM data is updated immediately to subscribers after modifications are made to the PLM data, conversions are performed in real-time, displaying is performed in real-time, and so forth.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing apparatus comprising:
a data processing component that receives product lifecycle management ("PLM") data from a plurality of client applications in a collaborative environment, wherein the PLM data is in a client specific format;
a subscription component that receives one or more subscription requests for automatic ongoing PLM data updates from each client application of the plurality of client applications wherein the one or more subscription requests are requests to subscribe to a selected portion of the PLM data that is useful to the respective client application;
a conversion component that converts the PLM data from the client specific format to a generic format; and
a storage component that stores the PLM data in the generic format,
wherein the conversion component converts subscription data from the generic format to the client specific format, wherein the subscription data corresponds to the selected portion of the PLM data stored in the generic format that is useful to the respective client application, and the subscription component provides the subscription data to the plurality of client applications based on the one or more subscription requests, and
wherein the data processing component, the subscription component, the conversion component, and the storage component are integrated into one or more non-application executable layers of the computing apparatus and each component thereof comprises one or more of hardware and executable code that is stored on one or more computer readable storage media.

2. The apparatus of claim 1, wherein the conversion component comprises a mapping component that includes conversion algorithms to convert the PLM data from the client specific format to the generic format.

3. The apparatus of claim 1, wherein the storage component comprises a database.

4. The apparatus of claim 3, comprising an estimation component that calculates an estimate using data from a plurality of related fields in the database.

5. The apparatus of claim 4, wherein the estimation component uses flagged items from the plurality of related fields to calculate the estimate.

6. The apparatus of claim 5, comprising a selection component that selects items to mark as the flagged items.

7. A method comprising:
  receiving product lifecycle management ("PLM") data from a plurality of client applications in a collaborative environment, wherein the PLM data is in a client specific format;
  receiving one or more subscription requests for automatic ongoing PLM data updates from each client application of the plurality of client applications wherein the one or more subscription requests are requests to subscribe to a selected portion of the PLM data that is useful to the respective client application;
  converting the PLM data from the client specific format to a generic format;
  storing the PLM data in the generic format;
  converting subscription data from the generic format to the client specific format, wherein the subscription data corresponds to the selected portion of the PLM data stored in the generic format that is useful to the respective client application;
  providing the subscription data to the plurality of client applications based on the one or more subscription requests; and
  wherein the operations of receiving PLM data, receiving one or more subscription requests, converting the PLM data, storing the PLM data, converting subscription data, and providing the subscription data are integrated into one or more executable layers of a computing apparatus dedicated to product lifecycle management.

8. The method of claim 7, wherein the PLM data comprises one or more of engineering data, computer-aided design ("CAD") data, and supply-chain management data.

9. The method of claim 7, wherein converting the PLM data from the client specific format to the generic format comprises using conversion algorithms.

10. The method of claim 7, wherein storing the generic format of the PLM data comprises storing the generic format of the PLM data in a database.

11. The method of claim 10, wherein the database operates with referential integrity.

12. The method of claim 10, comprising calculating an estimate using data from a plurality of related fields in the database.

13. The method of claim 12, wherein calculating the estimate using the data from the plurality of related fields in the database comprises using flagged items from the plurality of related fields to calculate the estimate.

14. The method of claim 13, comprising manually selecting items to mark as the flagged items.

15. The method of claim 13, comprising selecting items to mark as the flagged items using a predetermined algorithm.

16. The method of claim 7, wherein converting subscription data from the generic format to the client specific format comprises using conversion algorithms.

17. The method of claim 7, wherein providing the subscription data to the plurality of client applications based on the one or more subscription requests comprises providing immediate updates to the plurality of client applications before the PLM data is stored.

18. A non-transitory computer program product for product lifecycle management ("PLM") collaboration, the computer program product comprising a computer readable storage medium having program instructions embodied therewith, the program instructions executable by a processor to cause the processor to:
  receive PLM data from a plurality of client applications in a collaborative environment, wherein the PLM data is in a client specific format;
  receive one or more subscription requests for automatic ongoing PLM data updates from each client application of the plurality of client applications wherein the one or more subscription requests are requests to subscribe to a selected portion of the PLM data that is useful to the respective client application;
  convert the PLM data from the client specific format to a generic format;
  store the PLM data in the generic format;
  convert subscription data from the generic format to the client specific format, wherein the subscription data corresponds to the selected portion of the PLM data stored in the generic format that is useful to the respective client application;
  provide the subscription data to the plurality of client applications based on the one or more subscription requests; and
  wherein the compute program product is integrated into a computing apparatus dedicated to product lifecycle management.

19. The computer program product of claim 18, wherein the PLM data comprises one or more of engineering data, computer-aided design ("CAD") data, and supply-chain management data.

20. The computer program product of claim 18, wherein the program instructions executable by the processor further cause the processor to use conversion algorithms to convert the PLM data from the client specific format to the generic format.

* * * * *